United States Patent [19]

Selam

[11] 4,028,603

[45] June 7, 1977

[54] DEVICE FOR DETECTING AND POSITIONING A MOBILE OBJECT CAPABLE OF MOVING IN AT LEAST ONE GIVEN PATH

[76] Inventor: Gabriel Selam, 161, Boulevard Edouard Vaillant, 93 Aubervilliers, France

[22] Filed: June 24, 1975

[21] Appl. No.: 589,946

Related U.S. Application Data

[63] Continuation-in-part of Ser. No. 381,070, July 20, 1973.

[30] Foreign Application Priority Data

July 31, 1972 France .............................. 72.27550
Dec. 7, 1972 France .............................. 72.43528

[52] U.S. Cl. ............................... 318/587; 104/7 R; 340/282; 246/167 D
[51] Int. Cl.² ......................................... G05D 4/00
[58] Field of Search ................ 246/167 D, 415, 23; 318/587, 592, 594; 33/1 M, 125 R, 125 C; 104/7; 340/282, 267 D

[56] References Cited

UNITED STATES PATENTS

| 2,988,237 | 6/1971 | Devol | 214/11 |
| 3,001,081 | 9/1961 | Bower | 33/125 |
| 3,358,202 | 12/1967 | Pabst et al. | 318/594 |
| 3,481,042 | 12/1969 | Lemelson | 33/174 C |
| 3,550,535 | 12/1970 | Rooklyn | 104/118 |
| 3,579,836 | 5/1971 | Kraus | 33/125 C |

FOREIGN PATENTS OR APPLICATIONS

| 2,350,533 | 4/1974 | Germany | 246/167 D |
| 2,215,666 | 10/1973 | Germany | 318/587 |
| 448,547 | 4/1968 | Switzerland | 33/125 |
| 1,073,995 | 6/1967 | United Kingdom | 33/1 |

*Primary Examiner* — Gene Z. Rubinson
*Assistant Examiner* — John J. Feldhaus
*Attorney, Agent, or Firm* — Eric P. Schellin

[57] ABSTRACT

Detecting device for detecting the position of a mobile object movable in at least one given path. It comprises a distance sensor fixed to the object and a distance information support extending along said path so that it can be scanned by the sensor. The sensor comprises means for producing distance signals pertaining to the instantaneous position of the mobile object.

A positioning device for said mobile object employs the detecting device and includes a circuit for treating the electric signal furnished by the detecting device.

30 Claims, 8 Drawing Figures

DEVICE FOR DETECTING AND POSITIONING A MOBILE OBJECT CAPABLE OF MOVING IN AT LEAST ONE GIVEN PATH

The present application is a Continuation-In-Part of my application Ser. No. 381,070 filed July 20, 1973.

The present invention relates in a general way to the detection of the position and to the control of the movement of a mobile object capable of moving in one or more paths in a given space. More particularly, the invention concerns a device for detecting the position and a positioning device employing said detecting device for mobile objects having relatively large masses such as hoisting machines, travelling cranes, handling trucks and the like.

Some detecting and positioning devices known at the present time employ sensors which are connected to a rotating element and are consequently difficult to employ if the mobile object is liable to slip, for example during the acceleration or braking.

Positioning devices are moreover known, employed in particular in machine tools, for shifting parts of the latter with high precision. However, these devices are not compatible with the large masses of the mobile objects envisaged by the present invention and do not permit reaching high speeds for the objects moved.

In these devices, the part to be shifted to movable on a pathway and is rigid with a sensor detecting information about the movement to be performed, this information being recorded on an information carrier extending parallely with the pathway of the movable part. Such an arrangement works quite satisfactorily in the case of machine tools and in each case wherein the object to be moved is not a heavy object.

It has appeared that it would be highly desirable to control movements of a heavy mobile object such as a travelling crane, hoisting device, by means of an information carrier and a sensor in a manner analogous to that usual in the machine tool field. However, since heavy mobile objects, such as travelling cranes are often of considerable mass, in the order of several tons for example, and since the sensor is generally lightweight, as is the information carrier associated therewith, the problem has arisen to compensate for the parasitic movement to which the object is subjected when running on its pathway. Such parasitic movement can be caused for example by a partial deformation of the guide rails where the mobile object is running on, for example when it is running on a part of the guide rails extending between two successive support means of a series of support means supporting the guide rails. In the particular case of a travelling crane, the load suspended on the hoisting block can amplify such deformations depending upon whether the hoisting block which is movable transversely with respect to the travelling crane, as usual, is suspended in the middle or in the vicinity of one or the other of the guide rails.

The parasitic movements of the mobile object then cause it to "wobble" on the guide rails and the magnitude of such movements can reach readily several centimeters without disturbing in any way the correct movement thereof. Now, it is clear that several centimeters are insignificant and negligible for the heavy mobile object, but they are most important for a sensor which is caused to detect information on a carrier, since a parasitic movement of the heavy mobile object can then cause a shift of the sensor with respect to the carrier so that it can no longer detect the information recorded thereon. For example, when several tracks are provided on the carrier each having a given information recorded thereon, the sensor can then shift from one track to the other which of course causes a malfunction of the control of the heavy objects movement.

It is therefore an object of the present invention to provide an apparatus for detecting and controlling operation of a heavy mobile object, such apparatus performing its function irrespective of parasitic movements of the heavy mobile object when running on its pathway and irregularities thereof, it being possible to effect the displacement rapidly and the apparatus being practically insensitive to vibrations due to deformations of the path, to shocks and generally to the surrounding medium in which the mobile object moves.

The invention thus provides an apparatus for detecting the position of a heavy mobile object capable of moving in at least one given path, comprising an elongated information-bearing support with means for mounting it so as to extend in a direction parallel with and in the general vicinity of the pathway. The information-bearing support has distance information data provided thereon and this information is sensed by a distance or position sensor resiliently mounted on the heavy mobile object so that the information data is capable of being correctly scanned by the sensor when the object moves along the pathway and irrespective of any irregularities or deformations thereof due in particular to movement of the heavy mobile object thereon. Means are associated with said sensor for producing distance signals relating to the instantaneous position of the heavy object in response to detection of the information by the sensor and the distance information data are recorded on said information-bearing support in at least two parallel bands having different distance scales, the parallel bands being capable of being scanned by the sensor. Further the apparatus comprises a control circuit operatively connected to the sensor and capable of using the distance signals to control operation of the heavy mobile object.

Owing to these features of the apparatus, it is possible to obtain a precise positioning of the mobile object while moving it rapidly, since the different bands may pertain to different speeds of the mobile object. For example, the latter may be first moved at high speed and thereafter, as soon as it reaches the region to which it must be brought, at a progressively decreasing speed, the lowest speed corresponding then to an information band having the largest scale or the finest definition.

Consequently, the control circuit connected to said sensor comprises preferably means for assigning the distance information to different speeds of said mobile object.

The control circuit preferably comprises also means for establishing a variable command signal whose magnitude represents the desired position in which the object must be placed. Also provided are means for comparing the distance signal obtained from the sensor with the command signal, the result of the comparison being employed for controlling the movement of the mobile object, this movement occurring until an error signal is nil.

Owing to these features, it is possible to furnish the apparatus a command signal which can be produced manually or automatically, for example by means of a predetermined program which is applied thereto in a suitable manner, for example by a computer.

If the mobile object must move in different paths, for example perpendicular to each other, there may be provided in the apparatus according to the invention a plurality of apparatuses each one of which pertains to a given path, these apparatuses co-operating with a command circuit comprising means for co-ordinating the signals produced by the sensors of said apparatuses so that the mobile object moves in a well determined order in its paths.

Further features and advantages of the invention will be apparent from the ensuing description with reference to the accompanying drawings.

Figure 1:
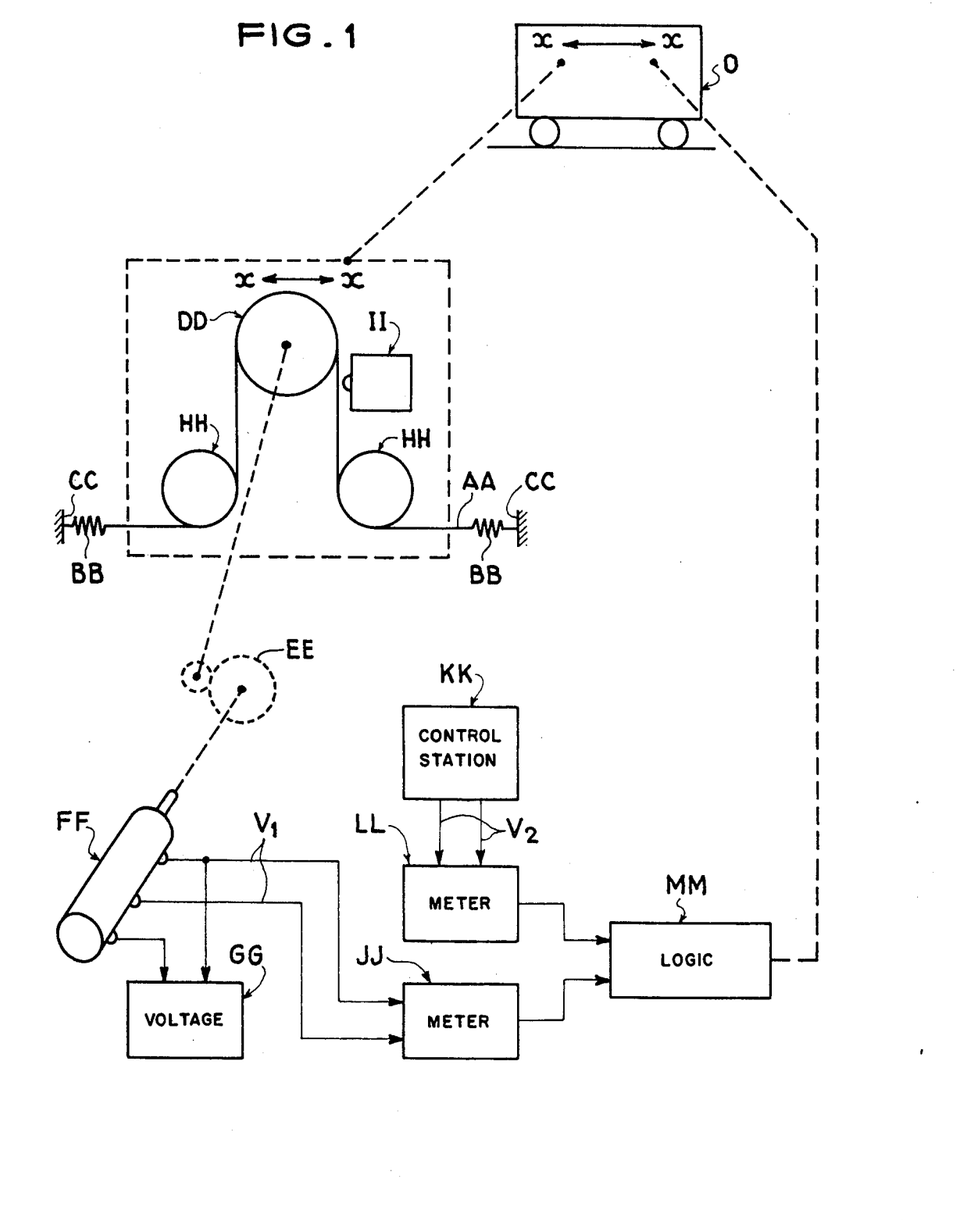
FIG. 1 is a very simplified diagram of a positioning device according to the invention comprising a position detecting device, the assembly being arranged in accordance with a first embodiment of the invention.

A first embodiment of a detecting device and positioning device according to the invention is constructed as follows (FIG. 1).

By means of a wire, tape or perforated tape AA attached at both ends, for example by means of springs BB having two fixed points CC, a wheel DD which, for example, has a groove or is covered with an adherent surface or has points is rotated when the mobile object moves in the path x—x, but the wheel may also be driven directly by adherence by bearing against a surface or runway and serve to drive a tape, wire or any other auxiliary device. The wheel DD is rotatably mounted on a case integral with the mobile object O.

It will be understood that the rotation of the wheel is in proportion to the axial displacement of the mobile object.

The wheel DD may be coupled, directly or through a speed reducer EE, to a rotary coding device FF which may be, for example, a multi-turn potentiometer, an optical coder, a magnetic coder, a coder having brushes or other means.

The coding means may be connected to a source of voltage GG and thus provide a voltage V1 which is proportional to the rotation of the wheel and therefore to the displacement; in another modification it may also furnish coded or uncoded pulses.

In order to obtain a good adherence and a regular or even displacement of the wire or tape AA, two small guide rollers HH are provided.

The regular displacement of the tape AA with respect to the wheel DD permits including, nearby, a coding or decoding device II which may be, for example, constituted by micro-contacts, electroluminescent diodes, photoelectric cells, brushes, proximity magnetic detectors, permanent magnets, or other means.

It will be clear that the tape AA must then be provided to suit this coding possibility and may have orifices, reflecting surfaces, alternating conductive zones and insulating zones, clear and opaques zones, metal masses or bosses, permanent magnets or a localized magnetization which is modulated or unmodulated.

The information received may be displayed by means of a suitable device JJ such as a frequency meter, a voltmeter having a needle or a numerical voltmeter, a luminous indicator and panel.

This information may be compared directly or at the coded output of the numerical voltmeter JJ with another information V2 furnished by a control station or input device KK which may be, for example, a keyboard, a control desk, a programming matrix or a computer.

The information furnished by the devices JJ and LL may be compared by means of a logic MM which establishes a sequential program and gives the suitable orders or instructions to the mobile object, that is to say, for example, the direction of movement, regulation of the speed, slowing down braking stoppage or other instructions. In the case of a machine-tool, there may also be given instruction concerning the operations to carry out in the case of handling, instructions concerning the regulation of the circulation of the goods to be stored. In both cases, information concerning the identification and the coding of the operations or of the goods may be recorded on the same tape.

Also included in the tape AA may be one or more conductive wires or magnetic bands for transmitting complementary information and instructions, for example by carrier currents.

There may also be coupled with the wheel a magnetic band reader for transmitting sound or vocalized information.

This device is compatible with analog or numerical control and programming devices.

It will be clear that by means of this device, it is possible to cause a mobile object to carry out the most simplest and the most complex operations such as:
 displacement between predetermined different positions either along an axis or in a plane defined by two axes or in a volume defined by three axes;
 automatic or programmed handling and storing;
 execution of a work or sequence program in handling machines or machine-tools.

Figure 2:
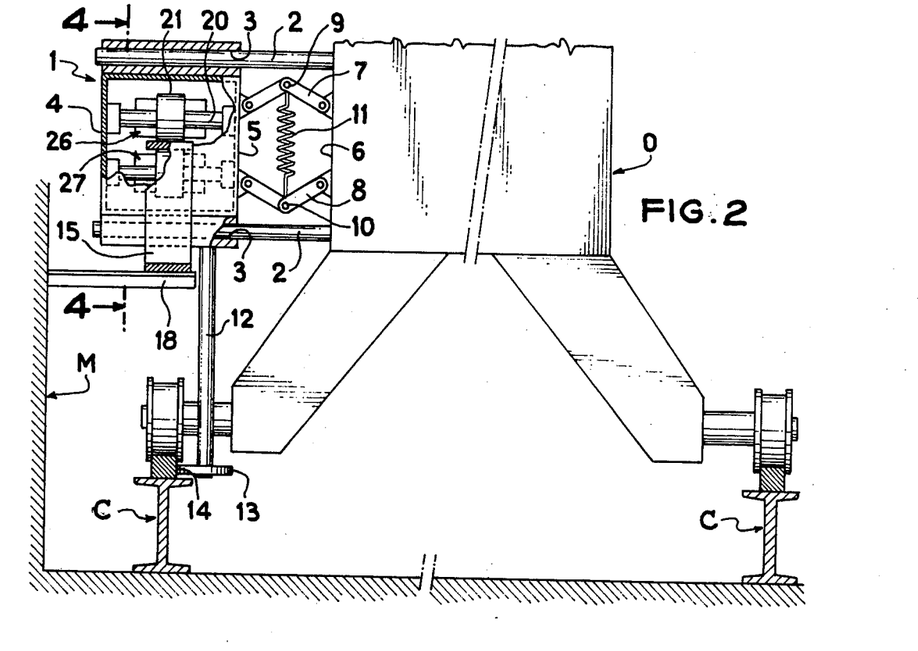
FIG. 2 is a diagrammatic elevational view, partly in section, of a mobile object moving in a given path and associated with a detecting device according to another embodiment of the invention and including a position sensor and an information support.
Figure 3:
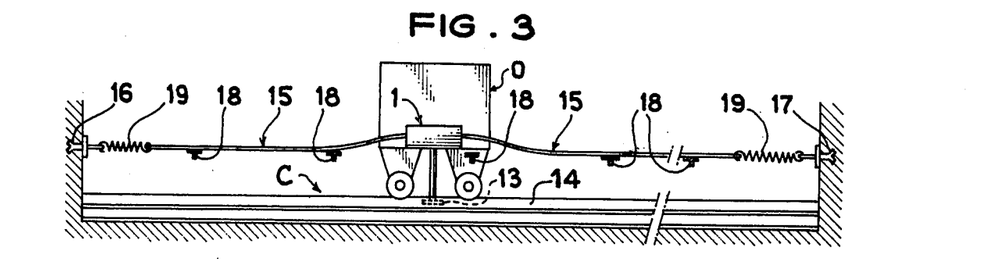
FIG. 3 is a diagrammatic side elevational view, to a reduced scale, of the mobile object, information support and position sensor shown in FIG. 1.
Figure 4:
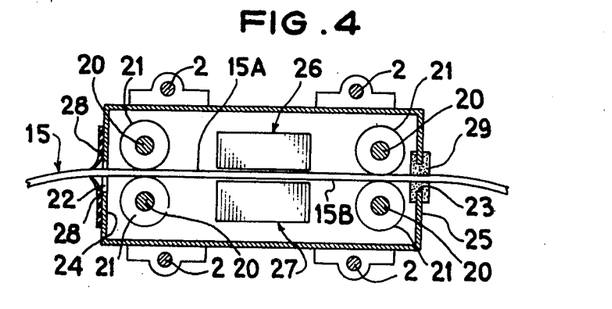
FIG. 4 is a sectional view taken on line 4—4 of FIG. 2.

FIGS. 2-4 illustrate another embodiment of the invention.

Note that although the position detecting device according to the invention may be employed in any mobile object it will be assumed in the description which will now follow that it is employed in association with a travelling crane which must for example operate in a mechanical construction works or the like. It will be observed that in the embodiments described herein the mobile object only moves in a single rectilinear path whereas the detecting device may be employed for ensuring movements of the mobile object in a sinuous path or even in a plurality of paths oriented in three directions perpendicular to each other.

Returning now to FIGS. 2–4, it can be seen that the mobile object O is a travelling crane which may move on two runways C disposed along walls M of for example a construction works.

Associated with this mobile object O is a position sensor 1 which is secured to this object in the following way. Four guide rods 2 extend in a parallel and horizontal direction from the side of the object O facing the wall M. These rods 2 are introduced in passages 3 formed in bearings fixed to a case 4 of the position sensor 1. Disposed between the confronting faces 5 and 6 of the case 4 and mobile object O are two toggles 7 and 8 each of which comprises two links which are pivoted respectively to the sensor and to the mobile object. The middle pivots 9 and 10 of these toggles 7 and 8 are interconnected by an elastically yieldable means such as a tension spring 11. The latter therefore biases the toggle to an open position or, in other words, tends to move the position sensor 1 away from the mobile object O.

A support rod 12 extends vertically downwardly and carries at its free end a follower 13 constituted by a roller which rolls along a lateral surface 14 of a runway C above which the position sensor 1 moves.

It will be understood from the foregoing description that the position sensor is maintained constantly in a given lateral position with respect to the runway C and therefore at a given distance from the wall M of the building.

FIGS. 3 and 4, in particular, show that the positioning device comprises an elongate information support 15 which is held taut between two fixed points 16 and 17 respectively representing the start and the end of the path along which the mobile object O is movable.

In the embodiment shown in FIGS. 2–4, this information support is constituted by a flexible tape having practically the same length as the runways C and supported freely on supports 18 which are embedded at spaced-apart points in the wall M of the building. The information support 15 is maintained taut between the fixed points 16 and 17 means of two springs 19 which are hooked between these fixed points and the ends of the information support 15.

The case 4 of the position sensor 1 has extending therethrough four parallel and horizontal spindles 20 which are journalled in this case and on which are keyed rollers 21 which are disposed in pairs near to two openings 22 and 23 formed in the front and rear walls 24 and 25 of the case 4.

The information support 15 extends through the case 4 through openings 22 and 23 and passes between the rollers 21 so as to be presented in a correct position in front of two readers reproducing means 26 and 27 which are fixed in the case 4 above and below the path of the tape 15. These readers 26 and 27 are capable of reading the information recorded on the two information bands 15A and 15B of the tape 15.

FIG. 4 shows two closing lips 28 located in front of the opening 22 and a cleaning pad 29 which is disposed in the slot 23 and through which the tape 15 passes so as to be constantly cleaned by the pad. With this arrangement the interior of the case 4 is shielded from dust.

In the course of the movement of the object O along the runways C, the tape 15, which remains parallel to the wall M of the building, passes into the position sensor 1 so that the readers 26 and 27 are able to read the information recorded on the tape. During this movement, the portion of tape in front of which the mobile object is located is slightly raised from the corresponding supports 18 and is correctly presented in front of the readers 26 and 27.

Figures 5, 6:
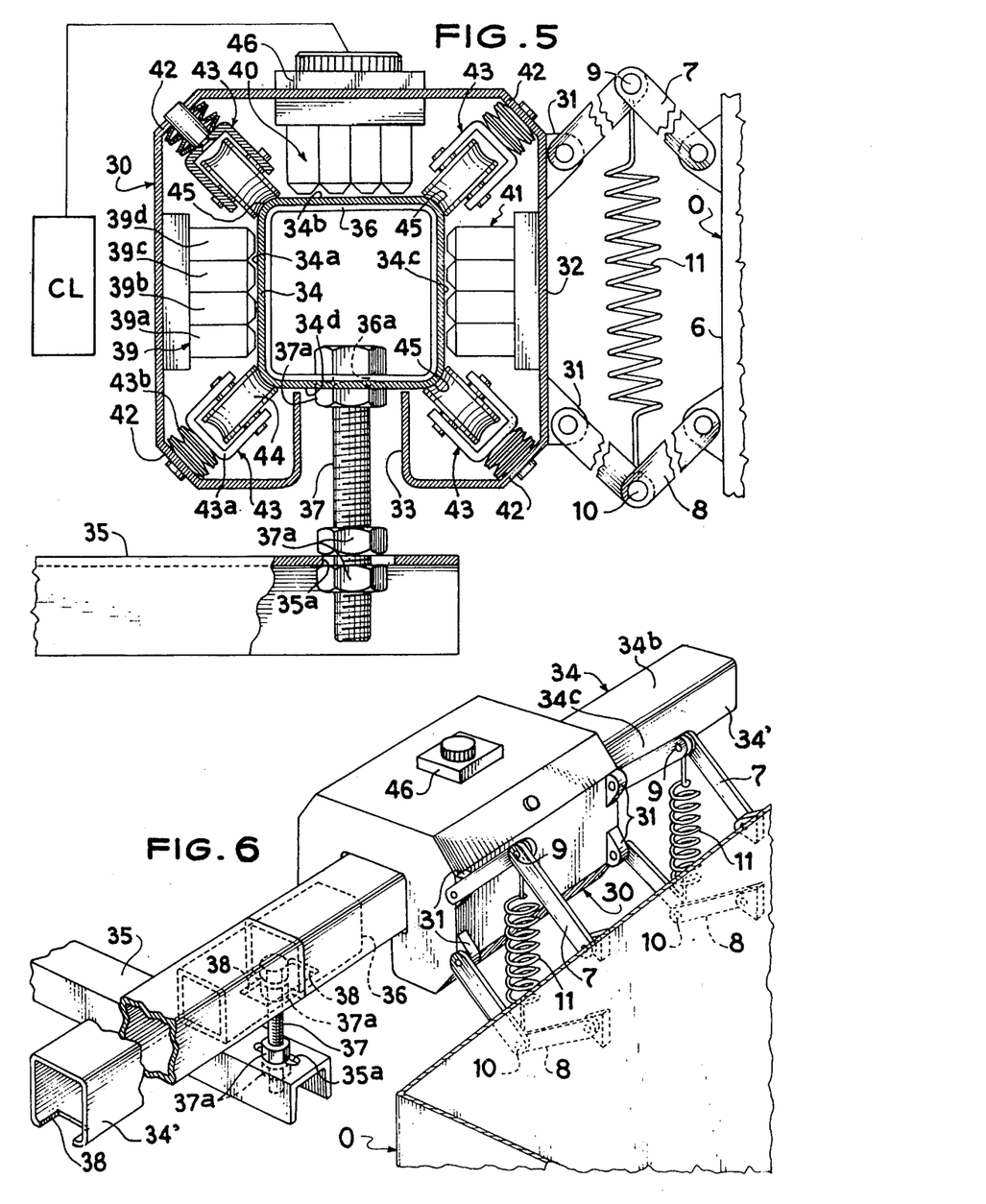
FIG. 5 is a cross-sectional view of a position sensor associated with an information support, these elements being part of a third embodiment of the invention.
FIG. 6 is a perspective view, to a scale smaller than that of FIG. 5, of the same sensor and a particular embodiment of the information support shown in FIG. 5.

Another embodiment of a position detecting device is shown in FIGS. 5 and 6. It comprises a position sensor 30 which is resiliently mounted to a mobile object O by four lugs 31 integral with a lateral wall of a case 32 of this sensor. As in the previously described embodiment these lugs are respectively connected to two toggles 7 and 8 each of which comprises two links which are pivoted respectively to the sensor and to the mobile object. Moreover, the middle pivots 9 and 10 of these toggles are interconnected by an elastically yieldable means such as tension spring 11. Case 32 has a substantially rectangular sectional shape and defines in its bottom wall or end wall a longitudinal slot 33 defined by two inwardly-folded longitudinal flange portions.

The position sensor 30 co-operates with a fixed information support 34 which is in the form of a substantially square-sectioned, substantially rigid girder. This girder is rigidly mounted on fixed supports 35 which are spaced along the path of movement of the mobile object.

The information support 34 has three information surfaces 34a, 34b and 34c, respectively constituted by its upper surface and its two lateral surfaces, and a support surface 34d which is its bottom surface.

As seen in particular in FIG. 6, the girder 34 comprises sections 34' which are interconnected in the region of the supports 35 by a square-sectioned connecting element or fishplate 36 having outside dimensions which closely adapt themselves to the inside dimensions of th sections of the girder 34. Each fishplate 36 is fixed to the corresponding support 35 by a bolt 37 which extends through an aperture 35a provided in the support 35 and an aperture 36a provided in the lower wall of the section 36, locking nuts 37a being screwed on the bolt 37. The two ends of each girder section 34' are moreover notched at 38 in their lower wall. Thus, two adjacent sections define a rectangular opening affording a passage to one of the nuts 37a and to the bolt 37. In this way, a convenient and rapid fastening of the sections 34' is obtained after the fishplates 36 have been mounted.

The girder 34 can be made from any appropriate material which is so chosen that the information can be conveniently recorded on the faces 34a, 34b, 34c. For example, the girder can be made of a suitable hard plastics material.

Three groups 39, 40 and 41 of four readers 39a–39d, 40a–40d and 41a–41d respectively are mounted in the sensor 30 in front of three information surfaces 34a, 34b and 34c of the girder.

In the embodiment shown in FIGS. 5 and 6, the four readers of each group correspond to four information tracks recorded respectively on the information surfaces 34a, 34b and 34c. These tracks will be described in detail with reference to FIG. 7.

The longitudinal corners of the case 32 are formed by four inclined portions 42 from which inwardly extend supports 43 for four rollers 44. The supports 43 each comprise a yoke 43a and spring means 43b biasing each roller 44 against the corresponding longitudinal corners 45 of the girder 34. Consequently, reguardless of the tolerances of the girder 34 with which the sensor 30 is associated, the readers of the groups 39, 40 and 41 remain exactly in front of their associated information track in the course of the movement of the mobile object.

The information support 15 shown in FIGS. 2–4 and the girder 34 shown in FIGS. 5 and 6 carry information whereby it is possible to position the mobile object at any given point in its path. This information is, in the presently described embodimet, in a coded form which may be decimal, binary, binary coded decimal or in any other suitable form which is chosen in accordance with the particular application envisaged. The recording of the code may be achieved in different ways and in particular the following:

An electric recording may be provided by alternating insulating and conductive zones, the readers 26, 27 and the reader groups 39, 40 and 41 comprising in this case rubbing brushes which are in contact with these zones so as to close or open an electric circuit at the rythm of the coded information;

an optical recording may be provided by forming in the information support spaced-apart apertures or slots capable of masking or allowing through light which then impinges on the optical readers disposed in the sensor or by providing on the information support light and dark surfaces or reflecting or non-reflecting surfaces;

the information may be recorded in the capacitive or magnetic form by employing the corresponding readers;

there may be employed piezo-electric or micro-contact detecting systems.

The information recorded on the information support establishes in its most simple form a distance reference in the path of the mobile object with respect to one of the ends of this path. Thus each point of the path is defined by a certain code, for example a binary number.

Note that in practice it is difficult to obtain definition by points and in actual fact this path is divided into a number of small sections whose length depends on the fineness of the positioning it is desired to obtain.

When the information is coded in the binary form there may be provided on the information support a plurality of parallel tracks which extend longitudinally in the path of the mobile object. Each track may thus correspond to one digit in the binary number which defines a point of the path with respect to one end of the latter.

It is also possible to provide a plurality of groups of these tracks which extend in parallel directions, each having a particular definition. Such a coding of the information is particularly appropriate when the object to be positioned has a large mass since by a judicious scanning of the infomation it is then possible to obtain first a rough positioning of the object by moving it for example at high speed and thereafter an increasingly fine positioning by passing to a group of information tracks having a finer definition and by shifting the object at lower speed. It is then possible to provide a system for stopping the mobile object by determining the stoppage point on a group of tracks having the finest definition. In this case, the detecting device is associated with a logic circuit which permits effecting the required switchings and controlling the movements of the object in accordance with different speeds, from distance information detected by the sensor, the whole thus forming a complete positioning device.

Figure 7:
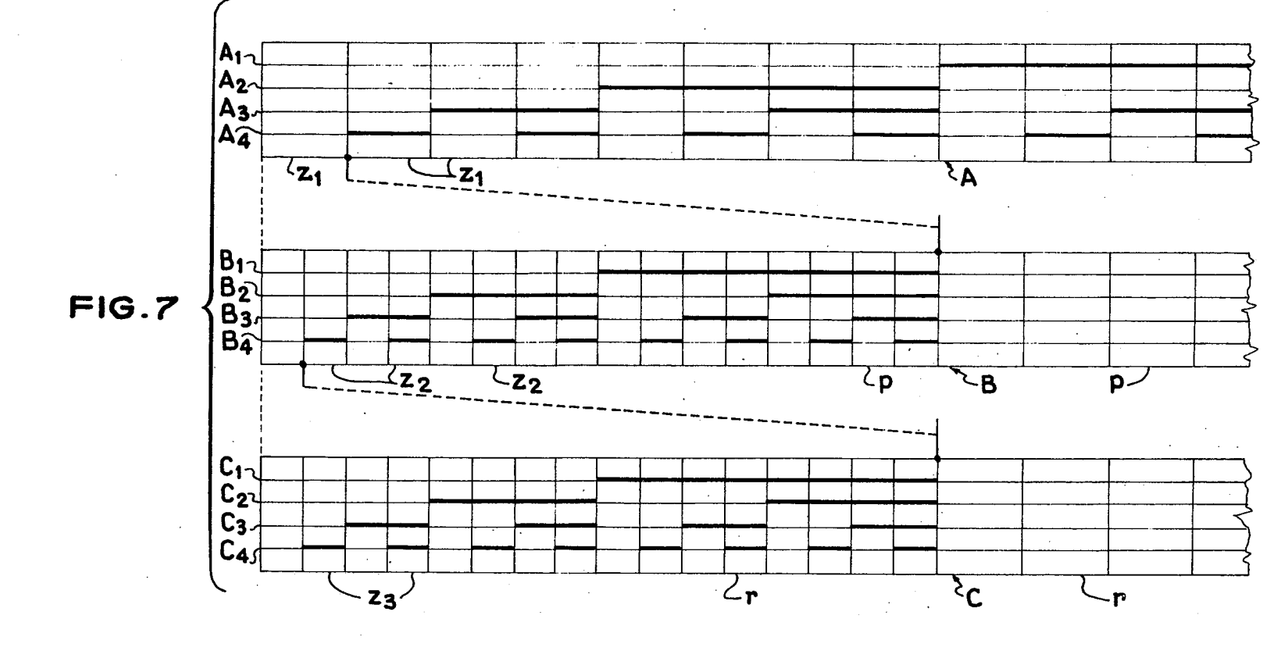
FIG. 7 is a diagram representing the code recorded on the information support employed in the positioning device according to the embodiment shown in FIGS. 5 and 6.

FIG. 7 shows by way of a non-limitative example one manner of coding the inforamtion on three parallel bands which extend throughout the length of the path of the object and each comprise four tracks having a different distance definition. The illustrated information bands are advantageously employed with the girder 34 shown in FIGS. 5 and 6, each band corresponding to one information surface or side $34a$, $34b$ or $34c$ of this girder and having four parallel tracks which respectively correspond to a group of readers 39, 40 or 41 shown in FIG. 5.

The band A shown in FIG. 7 which for example corresponds to the surface $34a$ of the girder 34 shown in FIG. 5, has four tracks $A_1$ to $A_4$ and it is divided into a number of transverse zones $z_1$ a distance code being recorded in each one of these zones and corresponding to a given binary number, the absence of information corresponding to the zero bit and the presence of information corresponding to the one bit.

In FIG. 7, the binary numbers recorded in the successive zones of the band A are increasing from the left to the right. Thus the first region of the band A which corresponds therefore to the number 0 has no information; the second zone carries a bit solely on the track $A_4$, which corresponds to the binary number 1; the third zone carries a bit on the track $A_3$ to the exclusion of the other tracks which corresponds to the binary number 10, etc.

The information band B has four tracks $B_1$ to $B_4$ and for each one of the zones $z_1$ of the band A an information area $p$ of which is seen in FIG. 7 a representation which is enlarged with respect to the zone $z_1$ of the band A. Each area $p$ is divided transversely into a number of zones $z_2$ which are also identified by binary numbers determined in the same way as described hereinbefore in respect of the band A. All the areas $p$ are identical and they are repeated as many times as there are zones $z_1$ on the band A.

The information band C has information regions $r$ each divided into a number of transverse zones $z_3$ which are identified by binary numbers. Each zone $z_3$ corresponds to a zone $z_2$ of the band B. Note that for purposes of clarity, the scales of the tapes A, B and C increase progressively in FIG. 7.

Consequently, the definition of the distance becomes increasingly fine when passing from band A to band B and from band B to band C. With four tracks in each band, it is possible to obtain, for the example shown in FIG.7, 16 zones of resolution per band and therefore a total of $16^3 = 4,096$ positioning points evenly distributed along the path.

In a particular example, which is not intended to be limitative, the following lengths for the zones $z_1$, $z_2$ and $z_3$, the total length of the path of the mobile object being 204.8 meters have been chosen:

TABLE I

| Information band | Zone | Zone length (in meters) | Total number of zones |
| --- | --- | --- | --- |
| A | $z_1$ | 12.80 | 16 per band |
| B | $z_2$ | 0.80 | 16 per area |
| C | $z_3$ | 0.05 | 16 per region |

Each reader $39a$–$39d$, $40a$–$40d$ or $41a$–$41d$ (FIG. 5) detects a corresponding track in front of which it moves, when the mobile object is driven in its path. In this way there is obtained at the outputs of the groups of readers electric signals corresponding to binary numbers which represent the region in which the object is located at a given moment.

Figure 8:
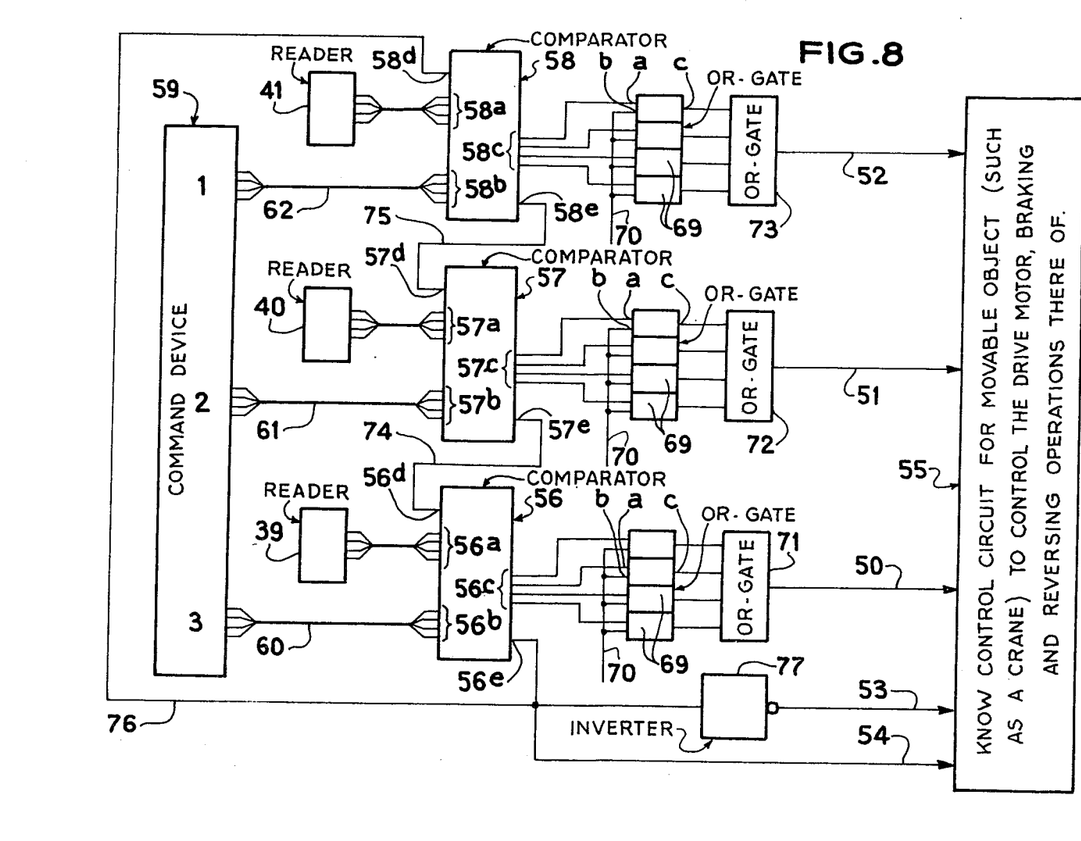
FIG. 8 is a simplified diagram of a logic circuit employed in the positioning device according to a third embodiment of the invention.

The electric signals furnished by the readers are transmitted to a connecting device 46 (FIGS. 5 and 6) which is connected to a logic treating circuit CL shown diagrammatically in FIG. 8.

The distance code just been described may be completed if desired by other information or data relating to the various instructions which must be carried out by the mobile object, such as instructions to weigh, handle objects, load, unload, measure or other instructions, depending on the nature of the contemplated mobile object. These data may be read by distinct readers passing in front of particular tracks provided on the information support. There may also be provided on the information support tracks which produce warning signals, illuminations, etc.

In the diagram shown in FIG. 8, there have been shown only the logic circuits pertaining to the displacement of the mobile object, which is a travelling crane in the presently-described embodiment, which the logic circuit CL may cause to operate at four speeds, namely:
high speed;
low speed;
pre-braking speed;
braking and stopping.

These four operations may be applied to the travelling crane for both forward speed and reverse speed.

The logic circuit CL produces output signals in accordance with the following table II.

TABLE II

| Signal | Symbol | Line of circuit CL |
|---|---|---|
| High speed signal | HSS | 50 |
| Low speed signal | LSS | 50 |
| Pre-braking signal | PBS | 51 |
| Braking and stopping signal | BSS | 52 |
| Forward travel signal | FTS | 53 |
| Reverse travel signal | RTS | 54 |

All of these signals are applied to a control circuit 55 which uses them for controlling the corresponding operating means of the crane (motor, brake or speed reverser). This control circuit 55 is arranged in a conventional manner and is easily constructed by one skilled in the art so that it is unnecessary to describe it in detail here.

Note that the lines 50 to 54 may carry selectively logic 1 and 0 states, the 0 state corresponding in the illustrated embodiment to the bringing into action of the corresponding operating means of the crane, except for that which is the means which controls the high and low speeds, whose excitation signal HSS must be a logic 1 state for the high speed and a logic 0 for the low speed.

The binary signals produced for the information tracks $A_1$ to $A_4$, $B_1$ to $B_4$, $C_1$ to $C_4$ are respectively applied to three comparator circuits 56, 57 and 58 each of which comprises two groups of inputs 56a, 56b, 57a, 57b and 58a, 58b respectively.

Each group comprises four inputs, the groups carrying the references with the letter *a* added receiving therefore the binary signal from the corresponding tracks of the information support 34.

In the presently-described embodiment, the comparator 56 corresponds to low speed, the comparator 57 to pre-braking and the comparator 58 to braking and stopping of the travelling crane.

The groups of inputs 56b, 57b and 58b of the comparators 56, 57 and 58 are connected to a device 59 for establishing command signals termed hereinafter "command device".

The latter permits the establishment either manually or automatically by means of a given program recorded for example on punched cards or the like, a command code representing, for example in binary, the code of the position in which the travelling crane must be positioned. The code appears for each comparator 56, 57 or 58 respectively at three groups 60, 61 and 62 of four outputs which are directly connected to the corresponding input groups 56b, 57b and 58b of the corresponding comparator. In other words, the output groups 60, 61 and 62 may represent either one zone of the band A (FIG. 7) or an area of the band B or a region of the band C depending on whether it concerns the groups 60, 61 or 62.

Each comparator circuit 56, 57 or 58 ascertains at each moment the difference between the position signal from the groups 39, 40 and 41 of the readers and the command signal from the three groups 60, 61 and 62 of the command device 59. The differential values thus produced appear at the groups 56c, 57c and 58c of four outputs of the corresponding comparators.

Each output of the comparators 56, 57 and 58 is connected to a first input *a* of an exclusive OR gate 69 which receives at its other input *b* a signal of logic 0 state through lines 70.

The output *c* of the exclusive OR gates are connected in groups of four to the OR gates 71, 72 and 73 which respectively furnish the signals HSS, LSS, PBS, BSS as indicated hereinbefore in table II.

The logic states of the lines 50, 51 and 52 are therefore "0" when the four corresponding exclusive OR gates 69 all furnish an 0 state signal at their outputs *c*, which is the case when all the first inputs *a* these exclusive OR gates 69 are in logic 0 state or, in other words, when, by the displacement of the crane toward the reference position, the difference between the position signal (inputs 56a, 57a or 58a) and the command signal (inputs 56b, 57b or 58b) are rendered null.

Each comparator 56, 57 or 58 comprises, furthermore, a borrow input 56d, 57d or 58d and a borrow output 56e, 57e or 58e. As can be seen in FIG. 8, the borrow outputs are connected to the borrow inputs of the adjacent comparators through lines 74, 75 and 76 respectively.

The borrow input 58d and the borrow output 56e are connected, on one hand, to the line 54 and on the other hand, to the line 53 through an inverter 77 so as to furnish the signals FTS and RTS (see table II).

Note that the comparator circuits 56, 57 and 58 may advantageously include the logic circuits produced by the firm SOCIETE DELLE EQUIPEMENTS AUTOMATIQUES, Villerurbanne, under the reference 6,710—29.

This logic circuit operates in the following manner (FIGS. 7 and 8):

When a command value is fed into the command device 59, which value corresponds to a binary code constituted by three binary numbers respectively corresponding to the three distance definitions or scales of the bands A, B and C shown in FIG. 7, it is immediately compared with the position signals which are furnished by the readers of the groups 39, 40 and 41 of the sensor 30 (FIGS. 5 and 6). According as the difference is positive or negative, a signal FTS or RTS appears in the line 53 or 54, the signal RTS, which corresponds to the 0 state, being inverted by the inverter 77. Either one of the lines 53 and 54 thus carries a logic 1 state which brings into action the direction reverser of the travelling crane so as to cause it to start moving in the corresponding direction. Simultaneously, the drive means of the crane is started up so as to cause the latter to travel at high speed, the signal in the line 50 being in logic 1 state if the position signal is greater in absolute value than the command signal fed into the input 56b of the comparator 56.

As soon as the crane enters the zone $z_1$ of the band A whose binary code has been fed into the device, the comparator 56 furnishes at these outputs, logic 0 states so that the corresponding exclusive OR gates 69 all furnish 0 states at their outputs. There results a change in the logic state from a logic 1 to a logic 0 in the line 50 which thenceforth produces the signal LSS. The drive means of the crane is then switched from high speed to low speed and the comparator 57 comes into action.

As soon as the position value furnished by the band B through the readers group 40 reaches the command value fed into the inputs 57b of the comparator 57, the signal of the line 51 passes into the logic 0 state by a process identical to that described hereinbefore but this time through the corresponding exclusive OR gates 69 and the OR gate 72. The signal PBS is then given and the pre-braking means of the crane is actuated.

As the travelling crane in this way once again reduces its speed, the comparator 58 starts to employ the position signals furnished by the readers group 41 which is in facing relation to the band C of the information support. As soon as the value fed into the inputs 58b of the comparator 58 corresponds to the position signal of the crane, the braking and stopping signal SFA is given i.e. a logic 0 is applied to line 52 and the braking means of the crane is actuated, stoppage of the crane occurring thus exactly in the zone $z_3$ whose binary code has been fed into the comparator 58.

If the mobile object is intended to move in a plurality of paths, for example paths which are perpendicular to each other, it is possible to provide a distance sensor for each one of these paths. In this case, the logic circuit CL has a plurality of identical units each one of which pertains to a particular sensor and controls the displacement of the object in one of the paths. In this case, there must be provided in the logic circuit CL means for co-ordinating the movements of the mobile object so that they occur in a well-determined order.

Having now described my invention what I claim as new and desire to secure by Letters Patent is:

1. Apparatus in combination with and for detecting the position of a heavy mobile object, such as a travelling crane, hoisting device or the like, capable of moving along at least one given pathway, said apparatus comprising:
    an elongated information-bearing support with means for mounting it so as to extend in a direction parallel with and in the general vicinity of the pathway;
    said information-bearing support having distance information data provided thereon;
    a distance or position sensor with means for resiliently mounting it on said heavy mobile object so that said information data is capable of being correctly scanned by said sensor when the said object moves along said pathway and irrespective of any irregularities or deformations of pathway due in particular to movement of said heavy mobile object thereon;
    means associated with said sensor for producing distance signals relating to the instantaneous position of said heavy object in response to detection of the information by said sensor;
    said distance information data being recorded on said information-bearing support in at least two parallel bands having different distance scales, said parallel bands being capable of being scanned by said sensor, and
    a control circuit operatively connected to said sensor and capable of using said distance signals to control operation of said heavy mobile object.

2. The apparatus of claim 1, wherein the distance information is recorded on said support in a coded form.

3. The apparatus of claim 1, wherein said support is in the form of a girder having a polygonal section and longitudinally extending surfaces, said information bands being recorded on at least two of said longitudinally extending surfaces, said girder being fixed with respect to said pathway.

4. The apparatus of claim 1, wherein each of said parallel bands is divided into a number of transverse zones, said transverse zones having equal lengths in each band.

5. The apparatus of claim 4, wherein an identical numerical code is given to each one of said zones, the code being representative of the distance between the zone concerned and a reference point of said support.

6. The apparatus of claim 4, wherein a zone of a first information band having a given distance definition corresponds to a group of zones of a second information band having a finer distance definition and the group of zones of said second band are repeated as many times as there are zones on the first band.

7. The apparatus of claim 5, wherein each band is divided longitudinally into a number of parallel tracks along which tracks are arranged information means representing selectively the presence and the absence of said information.

8. The apparatus of claim 6, wherein each band is divided longitudinally into a number of parallel tracks along which tracks are arranged information means representing selectively the presence and the absence of said information.

9. The apparatus of claim 7, wherein said information means are provided in electrical form.

10. The apparatus of claim 1, wherein said sensor comprises for each information band at least one reader for producing a distance signal, each reader being adapted to the manner in which the information it is intended to scan is recorded.

11. The apparatus of claim 10, wherein said resiliently mounted sensor comprises means for ensuring a constant transverse position of the sensor with respect to said support regardless of any lateral inaccuracy in the movement of the object in said pathway.

12. The apparatus of claim 11, wherein said sensor is integral with a follower moving along said pathway of the mobile object and said sensor is mounted on said mobile object to be movable in a direction transverse to said pathway, there being provided a longitudinally extending member which is parallel to and fixed with respect to said pathway and elastically yieldable means biasing the sensor in such manner that said follower is constantly applied against said member.

13. The apparatus of claim 11, wherein said support is in the form of a girder having a polygonal section and longitudinally extending surfaces, said information bands being recorded on at least two of said longitudinally extending surfaces, said girder being fixed with respect to said pathway, said sensor comprising a substantially box-shaped outer structure defining openings at opposite ends through which openings said girder freely extends, rolling means rollingly engaging four edges of said girder, and elastically yieldable means for biasing the rolling means against said four edges.

14. The apparatus as claimed in claim 1, wherein said control circuit connected to said sensor comprises means for allocating the distance information recorded on each of said parallel bands to a different operation performed by said mobile object.

15. The apparatus as claimed in claim 1, wherein said control circuit comprises means for establishing a variable command signal whose value represents the desired position in which said mobile object must be placed and means for estabishing at least one error signal and maintaining the error signal so long as said object has not reached said desired position.

16. The apparatus as claimed in claim 15, wherein said means establishing the error signal comprise at least one comparator capable of producing an output signal of given value so long as said command signal and said distance signal are not equal.

17. The apparatus as claimed in claim 15, wherein said control circuit comprises a plurality of comparators each of which pertains to a particular information band and said command signal comprises a plurality of distinct parts which are each introduced into a different one of said comparators so that a plurality of signals are produced for controlling a plurality of different operations performed by said mobile object.

18. The apparatus as claimed in claim 17, wherein said error signals control respectively high speed, low speed, prebraking, braking and stopping of the mobile object.

19. The apparatus as claimed in claim 15, wherein said control circuit comprises means for ascertaining the sign of the error signal so as to selectively produce a forward travel signal and a reverse travel signal for said mobile object.

20. The apparatus as claimed in claim 16, wherein the distance information is recorded on said information-bearing support in a coded form, the information code being binary whereby the comparator produces a binary output signal; further including circuitry provided with an assembly of exclusive OR gates producing an output signal and a single OR gate which produces an output representing said error signal, the binary output signal being sent to the assembly of exclusive OR gates and the assembly of exclusive OR gates producing an output signal sent to the single OR gate.

21. The apparatus as claimed in claim 1, wherein said distance information is recorded on said information-bearing support by means of at least one longitudinal band divided in a given number of transverse portions; said longitudinal band being also divided in four longitudinal tracks which, in each of said portions, define transversely with respect to said band a binary number; and with each track representing a digit of said number, whereby groups of successive portions on said band constitute zones which are repeated a given number of times along said band.

22. The apparatus as claimed in claim 21, wherein said support comprises at least two of said parallel longitudinal bands, a zone of a first one of said bands having a length equal to one transverse portion of a second one of said bands, whereby said first one of said bands has a finer distance definition than the second one of said bands.

23. The apparatus as claimed in claim 22, wherein the binary numbers in each of said zones are increasing by one unity from zero to a given binary number, said numbers increasing in the same direction in each of said successive zones.

24. The apparatus as claimed in claim 21, wherein the digits of said numbers are recorded in magnetic form on said band.

25. The apparatus as claimed in claim 21, wherein the digits of said numbers are recorded in optical form on said band.

26. For use in conjunction with and for detecting the position of a heavy mobile object capable of moving along at least one given path, a subcombination device comprising an elongated information-bearing support extending in parallel direction with said path, with distance information being carried by said support; a distance sensor with means for resiliently mounting on said mobile object so that said distance information is capable of being scanned by said sensor when the object moves along said path; said distance information being recorded on said information-bearing by means of at least one longitudinal band divided into a given number of transverse portions; said longitudinal band being also divided in four longitudinal tracks which, in each of said portions, define transversely with respect to said band a binary number; and with each track representing a digit of said number, whereby groups of successive portions on said band constitute zones which are repeated a given number of times along said band.

27. The subcombination of claim 26, wherein said support comprises at least two of said parallel longitudinal bands, a zone of a first one of said bands having a length equal to one transverse portion of a second one of said bands, whereby said first one of said bands has a finer distance definition than the second one of said bands.

28. The subcombination of claim 27, wherein the binary numbers in each of said zones are increasing by one unity from zero to a given binary number, said numbers increasing in the same direction in each of said successive zones.

29. The subcombination of claim 26, wherein the digits of said numbers are recorded in magnetic form on said band.

30. The subcombination of claim 26, wherein the digits of said numbers are recorded in optical form on said band.

* * * * *